(12) United States Patent
Jeong et al.

(10) Patent No.: US 11,827,565 B2
(45) Date of Patent: Nov. 28, 2023

(54) CEMENT MORTAR ADDITIVE COMPRISING HYDROPHOBIC SILICA, AND PREPARATION METHOD THEREFOR

(71) Applicant: LOTTE FINE CHEMICAL CO., LTD., Ulsan (KR)

(72) Inventors: Hyun Ji Jeong, Ulsan (KR); Bong Jin Kwon, Ulsan (KR); Ji Eun Ju, Ulsan (KR)

(73) Assignee: LOTTE FINE CHEMICAL CO., LTD., Ulsan (KR)

( * ) Notice: Subject to any disclaimer, the term of this patent is extended or adjusted under 35 U.S.C. 154(b) by 336 days.

(21) Appl. No.: 17/281,457

(22) PCT Filed: Sep. 26, 2019

(86) PCT No.: PCT/KR2019/012521
§ 371 (c)(1),
(2) Date: Mar. 30, 2021

(87) PCT Pub. No.: WO2020/071685
PCT Pub. Date: Apr. 9, 2020

(65) Prior Publication Data
US 2022/0002200 A1    Jan. 6, 2022

(30) Foreign Application Priority Data

Oct. 1, 2018 (KR) .......... 10-2018-0117147

(51) Int. Cl.
*C04B 24/38* (2006.01)
*C04B 14/06* (2006.01)
*C04B 24/12* (2006.01)

(52) U.S. Cl.
CPC .......... *C04B 24/386* (2013.01); *C04B 14/06* (2013.01); *C04B 24/126* (2013.01)

(58) Field of Classification Search
CPC ..... C04B 24/386; C04B 14/06; C04B 24/126; C04B 2111/00086; C04B 2111/0081; C04B 40/0042; C04B 28/02; C04B 2111/72; Y02W 30/91
See application file for complete search history.

(56) References Cited

U.S. PATENT DOCUMENTS

2018/0249706 A1    9/2018    Anderson et al.

FOREIGN PATENT DOCUMENTS

| EP | 1078897 A1 | 2/2001 | |
|---|---|---|---|
| JP | S49031793 U | 8/1974 | |
| JP | 2001003048 A | 1/2001 | |
| JP | 2002526247 A | 8/2002 | |
| JP | 2009-276787 A | 11/2009 | |
| JP | 2013116947 A | 6/2013 | |
| JP | 2015174772 A | 10/2015 | |
| KR | 20150050874 A | 5/2015 | |
| KR | 10-1758174 B1 * | 7/2017 | ............ C04B 18/08 |
| KR | 101758174 B1 | 7/2017 | |
| KR | 20180002972 A | 1/2018 | |
| WO | 2007/022852 A2 | 3/2007 | |

OTHER PUBLICATIONS

International Search Report issued in International Application No. PCT/KR2019/012521 dated Jan. 13, 2020 (2 pages).
Written Opinion issued in International Application No. PCT/KR2019/012521 dated Jan. 13, 2020 (5 pages).
Extended European Search Report issued in corresponding EP Application No. 19869038.0 dated Jun. 2, 2022 (6 pages).
Office Action issued in corresponding EP Application No. 19869038.0 dated Jun. 22, 2022 (1 page).
Office Action Issued In Corresponding Chinese Application No. 201980073985.1, dated May 6, 2022, 7 Pages.
Office Action issued in corresponding CN Application No. 201980073985 dated Jan. 19, 2023 (16 pages).
Office Action Issued In Corresponding Japanese Application No. 2021-523196, dated Apr. 1, 2022, 4 Pages.

* cited by examiner

*Primary Examiner* — Anthony J Green
(74) *Attorney, Agent, or Firm* — Osha Bergman Watanabe & Burton LLP

(57) ABSTRACT

The present disclosure relates to a cement mortar additive and a method of manufacturing the same. More particularly, the present disclosure relates to a cement mortar additive for solving the inhomogeneity, which is a problem caused by the deliquescence of urea, so that the deterioration of the physical properties of a cement mortar is prevented and the open time, water retentivity, and workability of the cement mortar are improved, and to a method of manufacturing the cement mortar additive.

11 Claims, 1 Drawing Sheet

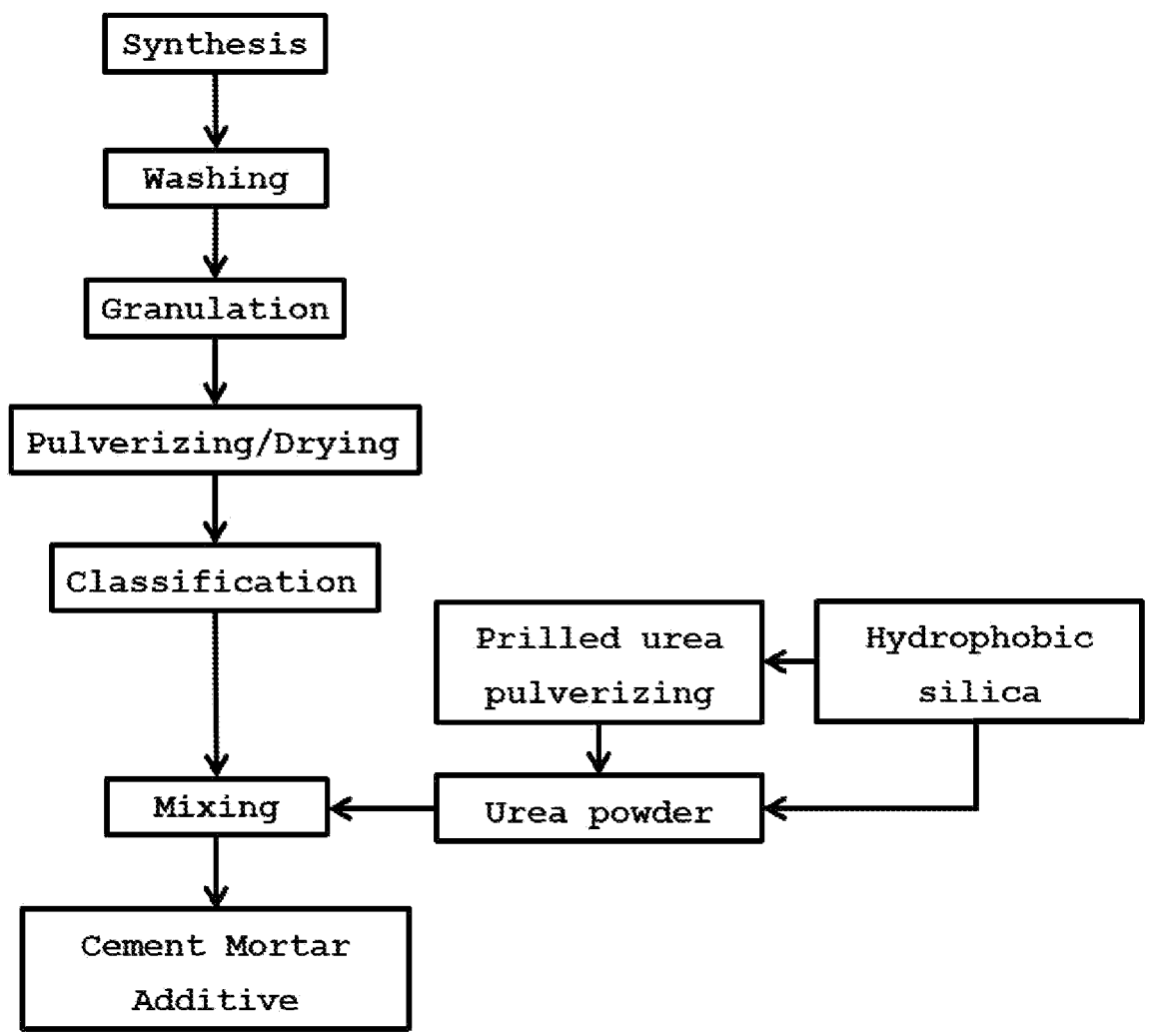

CEMENT MORTAR ADDITIVE COMPRISING HYDROPHOBIC SILICA, AND PREPARATION METHOD THEREFOR

TECHNICAL FIELD

The present disclosure relates to a cement mortar additive including hydrophobic silica and a method of manufacturing the same. More particularly, the present disclosure relates to a cement mortar additive containing urea, which includes hydrophobic silica so that an agglomeration phenomenon of the additive is suppressed to thus increase the long-term storage thereof, and to a method of manufacturing the same.

BACKGROUND ART

Cement mortar is obtained by mixing cement and sand with an appropriate amount of water, followed by kneading. The cement mortar is used for the final finishing of the interior, exterior, ceiling, and floor of a building, and additionally includes an additive composition for enhancing physical properties such as viscosity, adhesive force, and workable time in addition to main materials such as cement and sand.

Cellulose ether is a representative thickener of natural materials, and has the excellent thickening ability, water retentivity, adhesive property, and dispersibility, and also has the excellent stability caused by nonionic properties thereof, thus being widely used in various fields such as additives for construction, stabilizers for cosmetics, thickeners for household products, and organic binders.

In cement mortar, a thickener is used for the purpose of preventing separation of materials, extending a workable time, and maintaining moisture required for hardening of the cement which is a main material. However, when a sufficient workable time is not secured, there is a problem in that work efficiency is reduced due to insufficient adhesive strength and shortening of the workable time.

Accordingly, Korean Patent Application No. 2017-0106251 discloses a tile-cement-mortar-additive composition that includes cellulose ether and urea to improve a workable time and adhesive strength.

However, since the urea contained in the composition of the above-described document causes agglomeration between particles due to the characteristic deliquescence thereof, the long-term storage stability cannot but be considered in the process of moving, transporting, repackaging, and supplying same to consumers after the manufacture thereof, so the urea is present in the form of prills or granules. Accordingly, in order to uniformly mix the urea in the form of prills or granules with the cement mortar additive, pulverization into powder is required. In the case of the urea pulverized during a pulverization process, due to the deliquescence thereof, accumulation and fusion of the urea powder occur in facilities, such as apparatuses, inner pipes, and bag filters, in the pulverization process. This causes process problems such as a failure of the facility and a decrease in productivity, and also causes problems in that due to the mixing inhomogeneity of the powder and the low storage stability of the urea powder, the quality of the cement mortar additive becomes unstable and the physical properties of the cement mortar are deteriorated.

DISCLOSURE

Technical Problem

Accordingly, the present disclosure has been made keeping in mind the above problems occurring in the prior art, and an objective of the present disclosure is to provide a cement mortar additive for preventing the accumulation and fusion in an apparatus due to the deliquescence of urea, improving the storage stability, and enabling uniform mixing when cement mortar is mixed even in the state of powdering the urea, and a method of manufacturing the cement mortar additive.

Technical Solution

In order to accomplish the above objective, an embodiment of the present disclosure provides a cement mortar admixture including cellulose ether, urea powder, and hydrophobic silica.

In a preferred embodiment of the present disclosure, the cement mortar additive may include 65 to 89.3 wt % of the cellulose ether, 10 to 30 wt % of the urea powder, and 0.7 to 5 wt % of the hydrophobic silica.

In a preferred embodiment of the present disclosure, the cellulose ether may be one or more selected from the group consisting of alkyl cellulose, hydroxyalkyl cellulose, hydroxyalkylalkyl cellulose, alkylhydroxyalkyl cellulose, and alkylalkylhydroxyalkyl cellulose.

In a preferred embodiment of the present disclosure, the cellulose ether may be one or more selected from the group consisting of methyl cellulose, hydroxypropylmethyl cellulose, hydroxyethylmethyl cellulose, and hydroxyethyl cellulose.

In a preferred embodiment of the present disclosure, the viscosity of the cellulose ether aqueous solution having a concentration of 2 wt % may be 4,000 to 100,000 cps under a condition of 20° C. and 20 rpm, measured with a Brookfield viscometer.

In a preferred embodiment of the present disclosure, the urea powder may have an average particle size of 50 to 250 µm.

Another embodiment of the present disclosure provides a method of manufacturing a cement mortar additive. The method includes (a) pulverizing urea to provide the urea powder, and (b) mixing the urea powder with hydrophobic silica and cellulose ether.

Another embodiment of the present disclosure provides a method of manufacturing a cement mortar additive. The method includes (i) mixing urea and hydrophobic silica to provide a mixture, (ii) pulverizing the mixture to obtain a mixed powder, and (iii) mixing the mixed powder with cellulose ether.

In another preferred embodiment of the present disclosure, the cement mortar additive may include 65 to 89.3 wt % of the cellulose ether, 10 to 30 wt % of the urea, and 0.7 to 5 wt % of the hydrophobic silica.

In another preferred embodiment of the present disclosure, the cellulose ether may be one selected from the group consisting of alkyl cellulose, hydroxyalkyl cellulose, hydroxyalkylalkyl cellulose, alkylhydroxyalkyl cellulose, and alkylalkylhydroxyalkyl cellulose.

In another preferred embodiment of the present disclosure, the cellulose ether may be one selected from the group consisting of methyl cellulose, hydroxypropylmethyl cellulose, hydroxyethylmethyl cellulose, and hydroxyethyl cellulose.

In another preferred embodiment of the present disclosure, the urea powder may have an average particle size of 50 to 250 µm.

Advantageous Effects

According to the present disclosure, when hydrophobic silica is mixed during the pulverization of urea, it is possible to prevent the occurrence of process troubles in which urea is accumulated in or fused to piping or apparatuses during a process of pulverizing the urea.

Further, in a cement mortar additive according to the present disclosure, since urea and cellulose ether are mixed with hydrophobic silica, the problem caused by the deliquescence of the urea is overcome, thereby preventing quality instability of the cement mortar additive and deterioration of the physical properties of the mortar when mixed with the cement mortar.

DESCRIPTION OF DRAWINGS

FIG. 1 is a flow chart showing a mixing process of adding hydrophobic silica to a cement mortar additive according to the present disclosure.

BEST MODE

Unless otherwise defined, all technical and scientific terms used in the present specification have the same meaning as commonly understood by an expert skilled in the art to which the present disclosure belongs. In general, the nomenclature used in the present specification is well known and commonly used in the art.

When it is said that a part "includes" a certain component throughout the specification of the present application, it means that other components may be further included rather than excluding other components unless otherwise stated.

An aspect of the present disclosure relates to a cement mortar additive including cellulose ether, urea powder, and hydrophobic silica.

In general, cement mortar, that is, tile cement mortar, masonry mortar, or complement mortar, includes cellulose ether in order to prevent material separation, extend a working time, and secure water retentivity required for cement hardening. However, when a sufficient workable time is not secured, efficiency is reduced due to insufficient adhesive strength and shortening of the working time.

Accordingly, the present disclosure provides a cement mortar additive including cellulose ether and urea in order to solve the above problems, and enables uniform mixing of the additive by mixing hydrophobic silica with urea having deliquescence.

Various cellulose ether derivatives manufactured using natural cellulose pulp are widely used as cement mortar additives under the name of a thickener, a water retention agent, or a material-separation reducing agent. The main reason why the cellulose ether is used as the cement mortar additive is that the cellulose ether mixed with the cement mortar serves to perform three basic actions of water retention, hydration retardation, and air entrainment, which prevents condensation for a predetermined time, thereby improving workability for cement mortar, preventing the material separation, and increasing the strength of the hardened mortar.

The cellulose ether may include at least one selected from the group consisting of alkyl cellulose, hydroxyalkyl cellulose, hydroxyalkylalkyl cellulose, and hydroxyalkylalkylalkyl cellulose. Specifically, the cellulose ether may be at least one selected from the group consisting of methyl cellulose, hydroxypropylmethyl cellulose, hydroxyethylmethyl cellulose, hydroxyethyl cellulose, and ethylhydroxyethyl cellulose. More specifically, the cellulose ether may be hydroxypropylmethyl cellulose or hydroxyethylmethyl cellulose.

Further, the viscosity of the cellulose ether aqueous solution having a concentration of 2 wt % may be 4,000 to 100,000 cps at 20° C. and 20 rpm, measured with a Brookfield viscometer. When the viscosity is less than 4,000 cps, the water retentivity may be poor within a typical use range. When the viscosity is more than 100,000 cps, since the viscosity of the mortar is high, the mortar is not suitable for work, so workability thereof may be deteriorated.

As such cellulose ether, a commercially available product may be used, or the cellulose ether may be manufactured for use. In a manufacturing method thereof, a cellulose powder may be added to a reactor, an alkali agent such as caustic soda may be sprayed on the added cellulose powder and agitated, a diluting gas such as dimethyl ether may be further added to the reactor, and an etherification agent may be added to perform a reaction, thereby manufacturing the cellulose ether. For example, after 0.01 to 3.0 parts by weight of the etherification agent is added to the reactor based on 1 part by weight of the cellulose powder, the temperature of the reactor may be increased to to 70° C. to perform a primary reaction for 10 to 60 minutes and then increased to 60 to 90° C. to perform a secondary reaction for 10 to 180 minutes, thus manufacturing the cellulose ether.

The manufactured cellulose ether may be washed with a sufficient amount of hot water to remove salt, dried, and pulverized to be used as the cement mortar additive. Further, in order to increase the turbidity of the cellulose ether, the amount and concentration of the alkali agent and/or the dilution gas may be adjusted.

The average particle size of the cellulose ether added to the cement mortar additive may be 30 to 300 μm, and preferably 50 to 250 μm. When the average particle size of the cellulose ether is less than 30 μm or more than 300 μm, due to the separation of the material from the raw materials used for other additives and cement mortars, the physical properties of the final product may be deteriorated.

Further, the content of the cellulose ether added to the cement mortar additive may be 65 to 89.3 wt % and preferably 75 to 85 wt % based on the total weight of the cement mortar additive. When the content of the cellulose ether is less than 65 wt %, functions of additives such as water retentivity and hydration retardation may not be sufficiently expressed. When the content is more than 89.3 wt %, the contents of the urea and silica used while being mixed with each other are insufficient, which may cause a problem of the inferior open time strength in the cement mortar.

The urea includes a colorless and odorless granular crystal having a chemical formula of $CO(NH_2)_2$. The urea may have high solubility in water and may exhibit an endothermic pattern during dissolving in water, thereby retarding the hydration of cement which is an exothermic reaction. Further, the urea solution is difficult to evaporate compared to pure water, so the amount of water evaporated in the cement mortar is reduced, thereby increasing the open time and adhesive strength of the cement mortar.

Since the urea causes agglomeration between particles due to the characteristic deliquescence thereof, the long-term storage stability cannot but be considered in the process of moving, transporting, repackaging, and supplying to consumers after the manufacture thereof, so the urea is manufactured so as to be present in the form of prills or granules. However, in order to obtain the final product by mixing the cellulose ether and the urea in the form of powder, it is required to pulverize the urea into powder.

The pulverization of the urea is possible using any known method without limitation, and the pulverization size is also not particularly limited, but it is preferable that the average particle size of the urea be 50 to 250 μm for uniform mixing of the materials mixed with the additive.

With respect to the deliquescence of the urea powder, the hydrophobic silica may be mixed at an appropriate mixing ratio to prevent an agglomeration phenomenon between powders, and the hydrophobic silica may be added to the cement mortar additive, thereby obtaining the effect of homogeneous mixing.

The hydrophobic silica may be mixed with the cement mortar additive without limitation as long as the average particle size thereof is suitable for the hydrophobic silica to be added to the cement mortar additive. Preferably, the average particle size thereof may be 5 to 10 μm, and the specific surface area measured according to ISO 5794-1 may be 80 to 120 $m^2/g$ and preferably 90 to 110 $m^2/g$.

The hydrophobic silica may be included in a content of 0.7 to 5 wt % based on the total weight of the cement mortar additive. When the hydrophobic silica is added in a content of less than 0.7 wt % based on the total weight of the cement mortar additive, the problem of separation and classification of the urea may occur due to the deliquescence of the urea. When the content is more than 5 wt %, due to the addition of an excess amount of hydrophobic silica, the amount of the cellulose ether used is reduced at the weight ratio of the cement mortar, so the water retentivity and adhesive property may be reduced.

Another aspect of the present disclosure provides a method of manufacturing a cement mortar additive. Moreover, in the method of manufacturing the cement mortar additive to be described below, all of the additives described above may be applied. However, in order to prevent harming the essence of the present disclosure, a repeating description will be omitted below.

A method of manufacturing a cement mortar additive according to an embodiment of the present disclosure includes (a) pulverizing urea to provide urea powder, and (b) mixing the urea powder with hydrophobic silica and cellulose ether.

Further, a method of manufacturing a cement mortar additive according to another embodiment of the present disclosure includes (i) mixing urea and hydrophobic silica to provide a mixture, (ii) pulverizing the mixture to obtain a mixed powder, and (iii) mixing the mixed powder with cellulose ether.

In the method of manufacturing the cement mortar additive according to the present disclosure, it is necessary to pulverize the urea into powder in order to mix the cellulose ether and the urea in the form of powder to thus obtain a final product. Therefore, in the method of manufacturing the cement mortar additive according to an embodiment of the present disclosure, the hydrophobic silica may be added to the pulverized urea powder and then finally mixed with the cellulose ether, thus manufacturing the cement mortar additive. In the method of manufacturing the cement mortar additive according to another embodiment of the present disclosure, the urea and the hydrophobic silica may be pulverized and then the pulverized mixed powder may be finally mixed with the cellulose ether, thus manufacturing the cement mortar additive.

In the method of manufacturing the cement mortar additive according to the present disclosure, the pulverization of each step may be performed using a known typical pulverizer such as a cutting mill, a hammer mill, a pin mill, a screw mill, a roll mill, a ball mill, or a disc mill.

Further, mixing of each step may be performed using a known mixing method or mixing apparatus.

The cement mortar additive manufactured using the above method may be added to cement or aggregate to be applied to a cement mortar composition. The cement mortar may be, for example, a cement plaster, a tile cement mortar, or a cement mortar for extrusion. In the present specification, the term 'cement mortar composition' means that the above-described additive, cement, and aggregate are mixed in a dry state, and the term 'cement mortar' means that the cement mortar composition is mixed with water and then kneaded.

In this case, as the thickness of the cement mortar to be constructed is reduced, a large amount of the additive composition is used to secure water retentivity, and the content of the additive composition in the cement mortar may be 0.1 to 10 parts by weight based on 100 parts by weight of the cement. When the content of the additive composition is within the above range, workability is improved and adequate water retentivity is exhibited due to air intake, so a sufficient workable time is secured, and the tensile adhesion strength is improved.

Examples of the cement may include a hydraulic cement such as Portland cement, fly ash cement, and aluminum-containing cement (aluminous cement), and may also include color cement, but are not limited thereto. Further, if necessary, hemihydrate gypsum, slaked lime, calcium carbonate, and/or clay may be used together with the cement in the cement mortar.

Examples of the aggregate may include river sand, mountain sand, silica sand, or lightweight aggregate (for example, pearlite). In addition, emulsions and/or fiber materials may be mixed with the cement mortar. The mixing amount of the aggregate may be 30 to 300 wt % based on the weight of the cement.

MODE FOR DISCLOSURE

Hereinafter, the present disclosure will be described in detail with reference to Examples. However, the Examples according to the present disclosure may be modified in various forms, and the scope of the present disclosure should not be construed as being limited to the Examples described below. The Examples of the present disclosure are provided to more completely describe the present disclosure to those having average knowledge in the art.

Example 1

Urea (prill type, Mitsui Chemicals, Inc.) was pulverized so as to have an average particle size of 85 μm using a pin mill. The pulverized urea powder was mixed with hydrophobic silica [average particle size: 7 μm, Sipernat D17, Evonik Industries, specific surface area (ISO 5797-1) of 110 $m^2/g$] and hydroxyethylmethyl cellulose [MEMO, average particle size: 85 μm, 60,000 cps (Brookfield HA, 20 rpm, 2.0%, 20° C.), DS1.5, MS0.3, Lotte Fine Chemical] according to the contents of Table 1, thus manufacturing a cement mortar additive.

Examples 2 to 4 and Comparative Examples 1 to 4

Cement mortar additives were manufactured using the same method as in Example 1, except that mixing was performed according to the contents of Table 1.

In Comparative Example 2, hydrophilic silica (Sipernat 622S, Evonik Industries) was used instead of hydrophobic silica.

Examples 5 to 7 and Comparative Example 5

Cement mortar additives were manufactured using the same method as in Example 1, except that the urea was added together with hydrophobic silica and then pulverized instead of pulverizing the urea alone in the method of Example 1 and that mixing was performed according to the contents of Table 1.

TABLE 1

| Classification | Cellulose ether (wt %) | Urea powder (wt %) | Hydrophobic silica (wt %) | Hydrophilic silica (wt %) |
|---|---|---|---|---|
| Example 1 | 84.3 | 15 | 0.7 | — |
| Example 2 | 84 | 15 | 1 | — |
| Example 3 | 82 | 15 | 3 | — |
| Example 4 | 80 | 15 | 5 | — |
| Example 5 | 69 | 30 | 1 | — |
| Example 6 | 67 | 30 | 3 | — |
| Example 7 | 65 | 30 | 5 | — |
| Comparative Example 1 | 85 | 15 | — | — |
| Comparative Example 2 | 84 | 15 | — | 1 |
| Comparative Example 3 | 84.5 | 15 | 0.5 | — |
| Comparative Example 4 | 79 | 15 | 6 | — |
| Comparative Example 5 | 69.5 | 30 | 0.5 | — |

[Characteristic Evaluation]

In order to evaluate the applied physical properties of the additives manufactured in Examples 1 to 7 and Comparative Examples 1 to 5, the particle size, visual open time, 20-minute open time adhesive strength, and tensile adhesion strength of the additive were measured using the following method. All experimental materials and conditions except for the measurement of the sieving of the additive in a powder state were evaluated according to KS L ISO13007. The "open time" refers to the longest time for which a tile is capable of being attached to the target surface after applying a tile cement mortar on the target surface to be worked, and the criterion for judging is based on whether the tensile adhesion strength of the tile cement mortar attached satisfies the ISO 12004 standard.

(1) Sieving Measurement of Admixture in Powder State

The particle size of the powder was measured using a sieving method in order to confirm the agglomeration between particles caused by the deliquescence of urea in the cellulose ether mixed with the pulverized urea powder.

The measurement was performed at intervals of 1 day for 4 days while the cellulose ether mixed with the pulverized urea powder was exposed under a standard condition (23±0.5° C., 50±5%, <2 m/s).

100 g of the cellulose ether mixed with the urea powder was passed through a filtering sieve having a size of #140 mesh (106 μm) using a Haver EML Digital Plus model of a test sieve shaker manufactured by a Haver & Boechker Company, and the amount of powder having a size of 106 μm or less remaining in each sieve was measured. The measurement was performed under a condition of the test sieve shaker including a vibration intensity of 1.5 Hz for 1 minute.

TABLE 2

| | Amount of powder having particle size of 106 μm or less passing through #140 mesh (wt %) | | | |
|---|---|---|---|---|
| Classification | First day | Second day | Third day | Fourth day |
| Example 1 | 67.01 | 48.52 | 47.16 | 46.89 |
| Example 2 | 66.36 | 52.65 | 53.82 | 51.59 |
| Example 3 | 67.52 | 59.23 | 58.84 | 56.42 |
| Example 4 | 68.11 | 64.48 | 64.82 | 65.13 |
| Example 5 | 67.82 | 50.56 | 51.86 | 50.26 |
| Example 6 | 67.15 | 58.24 | 57.48 | 55.49 |
| Example 7 | 66.92 | 63.89 | 63.53 | 61.12 |
| Comparative Example 1 | 66.04 | 33.42 | 34.03 | 33.83 |
| Comparative Example 2 | 65.75 | 39.04 | 36.87 | 35.23 |
| Comparative Example 3 | 67.80 | 38.87 | 37.91 | 36.31 |
| Comparative Example 4 | 68.27 | 66.84 | 66.10 | 65.83 |
| Comparative Example 5 | 66.10 | 35.42 | 35.81 | 34.20 |

As shown in Table 2, in both the Examples and the Comparative Examples, the amounts of powders passing through #140 mesh were similar to each other on the first day. However, in all of the Comparative Examples except Comparative Example 4 containing 6 wt % of hydrophobic silica, the amount of the powder passing through #140 mesh on the second day dropped to about 30 wt %, causing a rapid agglomeration phenomenon. In contrast, in all of the Examples, the amount of the powder passing through #140 mesh was maintained at 45 wt % or more until the fourth day, accordingly, it can be confirmed that in spite of the deliquescence of the urea powder, the agglomeration phenomenon of the additive is greatly overcome when the hydrophobic silica is included in a predetermined amount or more.

(2) Manufacture of Cement Mortar Composition 2-1: Manufacture of Preliminary Tile Cement Mortar 35 wt % of a cement (product manufactured by Sampyo Cement company, Portland cement, KS L 5201 type 1), 31.5 wt % of silica sand #6 (particle size of 600 μm or less, average particle size of 300 μm), 31.5 wt % of silica sand #7 (particle size of 250 μm or less, average particle size of 150 μm), and 2.0 wt % of a re-emulsification powder resin (Wacker Vinapas 5044N) were mixed with each other, thus manufacturing 1 Kg of a preliminary tile cement mortar that did not contain the additive manufactured in the Examples and the Comparative Examples.

2-2: Manufacture of Mortar Dough

After 100 parts by weight of the preliminary cement mortar of item 2-1 was mixed with 0.3 parts by weight of the additive manufactured in the Examples and the Comparative Examples, water was added thereto so that the Brookfield viscosity of the tile cement mortar was 500±50 kcps, followed by kneading.

(3) Measurement of Attachable Time

Visual Open Time

The tile cement mortar manufactured in item (2) was applied on a concrete base and then left under temperature and humidity conditions including 23±0.5° C., 50±5%, and <2 m/s at intervals of 5 minutes for 40 minutes, a ceramic tile was attached thereto, and pressure of 19.6 KN/m² was applied for 30 seconds. The longest time, for which the adhesion amount of the tile cement mortar was capable of being maintained at 50% or more of the area when the ceramic tile was removed therefrom, was measured as the visual open time, and the measured time is shown in Table 3.

(4) Measurement of Adhesive Strength 4-1: 20-Minute Open Time Adhesive Strength

Valleys were formed in the kneaded tile cement mortar using a concavo-convex trowel (saw blade size of 6 m×6 m) on a concrete plate having an area of 40 cm×40 cm. After leaving for 20 minutes, a ceramic tile having a size of 5 cm×5 cm (absorption rate: 15±3%) was attached thereto, the manufactured specimens were allowed to stand for 28 days under standard conditions [temperature (23±2°) C. and relative humidity (50±5)%]. After curing, the adhesive strength of a tile adhesive was measured with an increase at a constant tensile speed of 250±50 N/s using an adhesive strength tester. The remaining average strengths excluding values exceeding ±20% of the standard deviation of the measured average strengths were calculated, and are shown in Table 3.

4-2: Tensile Adhesion Strength

The specimen curing and measurement for measuring the adhesive strength were performed according to KS L ISO 13007. For the purpose of evaluating all adhesive strengths, valleys were formed using a concavo-convex trowel (saw blade size of 6 m×6 m) on a concrete plate having an area of 40 cm×40 cm. After leaving for 5 minutes, a ceramic tile having a size of 5 cm×5 cm (absorption rate: 0.2% or less) was attached thereto, and the manufactured specimens were allowed to stand for 28 days under standard conditions [temperature (23±2°) C. and relative humidity (50±5)%]. After curing, the adhesive strength of a tile adhesive was measured with an increase at a constant tensile speed of 250±50 N/s using an adhesive strength tester. The remaining average strengths excluding values exceeding ±20% of the standard deviation of the measured average strengths were calculated, and are shown in Table 3.

Comparative Example 3 where the content of the hydrophobic silica was less than 0.7 wt % showed that the visual open time was reduced by about 25% from 20 minutes to 15 minutes. In Comparative Example 5, the tensile adhesion strength was also low. Further, in Comparative Example 4 where the content of the hydrophobic silica was more than 5 wt %, the visual open time and tensile adhesion strength tended to be reduced, indicating that there is an appropriate range of the content of the hydrophobic silica.

Therefore, the hydrophobic silica may be added to the cement mortar additive according to the present disclosure, thus solving the agglomeration phenomenon of admixtures caused by the deliquescence of urea even when the urea powder is included therein. Further, it could be confirmed that the degradation of the physical properties of the cement mortar is capable of being prevented depending on the content of the hydrophobic silica used in order to use an appropriate amount of urea.

Although the present disclosure has been described by limited embodiments and drawings, it is obvious that the present disclosure is not limited thereto, but various modifications and variations are possible by those of ordinary skill in the technical field to which the present disclosure belongs within the technical spirit of the present disclosure and the equivalent scope of the claims to be described thereafter.

The invention claimed is:

1. A cement mortar additive comprising:
   cellulose ether;
   urea powder; and
   hydrophobic silica,

TABLE 3

| | Mixing amount of additive (wt %) | | | | Measurement results of physical properties of cement mortar | | |
| --- | --- | --- | --- | --- | --- | --- | --- |
| Classification | Cellulose ether | Urea powder | Hydrophobic silica | Hydrophilic silica | Visual open time (min.) | 20-minute open time adhesive strength (N/mm²) | Tensile adhesion strength (N/mm²) |
| Example 1 | 84.3 | 15 | 0.7 | — | 20 | 0.75 | 1.51 |
| Example 2 | 84 | 15 | 1 | — | 20 | 0.73 | 1.50 |
| Example 3 | 82 | 15 | 3 | — | 20 | 0.71 | 1.43 |
| Example 4 | 80 | 15 | 5 | — | 20 | 0.74 | 1.40 |
| Example 5 | 69 | 30 | 1 | — | 25 | 0.87 | 1.32 |
| Example 6 | 67 | 30 | 3 | — | 25 | 0.85 | 1.32 |
| Example 7 | 65 | 30 | 5 | — | 25 | 0.82 | 1.30 |
| Comparative Example 1 | 85 | 15 | — | — | 20 | 0.75 | 1.52 |
| Comparative Example 2 | 84 | 15 | — | 1 | 20 | 0.72 | 1.49 |
| Comparative Example 3 | 84.5 | 15 | 0.5 | — | 15 | 0.74 | 1.51 |
| Comparative Example 4 | 79 | 15 | 6 | — | 15 | 0.76 | 1.35 |
| Comparative Example 5 | 69.5 | 30 | 0.5 | — | 25 | 0.88 | 0.88 |

As shown in Table 3, when the content of the urea powder is increased, the visual open time and the 20-minute open time adhesive strength are increased and the tensile adhesion strength tends to be reduced. In Examples 1 to 4, it can be confirmed that even when hydrophobic silica is included, there is no difference in physical properties compared to the case where silica is not included (Comparative Example 1).

In order to compare the changes in physical properties depending on the content of the hydrophobic silica, an experiment was performed in Comparative Examples 3 to 5.

wherein a content of the cellulose ether is 65 to 89.3 wt %, a content of the urea powder is 10 to 30 wt %, and a content of the hydrophobic silica is 0.7 to 5 wt %.

2. The cement mortar additive of claim 1, wherein the cellulose ether is one or more selected from the group consisting of methyl cellulose, hydroxypropylmethyl cellulose, hydroxyethylmethyl cellulose, and hydroxyethyl cellulose.

3. The cement mortar additive of claim 1, wherein a viscosity of a cellulose ether aqueous solution having a concentration of 2 wt % is 4,000 to 100,000 cps under a condition of 20° C. and 20 rpm, measured with a Brookfield viscometer.

4. The cement mortar additive of claim 1, wherein the urea powder has an average particle size of 50 to 250 μm.

5. A method of manufacturing a cement mortar additive containing urea powder, the method comprising:
   (a) pulverizing urea to provide the urea powder; and
   (b) mixing the urea powder with hydrophobic silica and cellulose ether,
   wherein the cement mortar additive includes 65 to 89.3 wt % of the cellulose ether, 10 to 30 wt % of the urea, and 0.7 to 5 wt % of the hydrophobic silica.

6. The method of claim 5, wherein the cellulose ether is one or more selected from the group consisting of methyl cellulose, hydroxypropylmethyl cellulose, hydroxyethylmethyl cellulose, and hydroxyethyl cellulose.

7. The method of claim 5, wherein the urea powder has an average particle size of 50 to 250 μm.

8. A method of manufacturing a cement mortar additive containing urea powder, the method comprising:
   (i) mixing urea and hydrophobic silica to provide a mixture;
   (ii) pulverizing the mixture to obtain a mixed powder; and
   (iii) mixing the mixed powder with cellulose ether.

9. The method of claim 8, wherein the cement mortar additive includes 65 to 89.3 wt % of the cellulose ether, 10 to 30 wt % of the urea, and 0.7 to 5 wt % of the hydrophobic silica.

10. The method of claim 8, wherein the cellulose ether is one or more selected from the group consisting of methyl cellulose, hydroxypropylmethyl cellulose, hydroxyethylmethyl cellulose, and hydroxyethyl cellulose.

11. The method of claim 8, wherein the urea powder has an average particle size of 50 to 250 μm.

* * * * *